Nov. 10, 1931. A. F. POOLE 1,831,261
CASE FOR ELECTRIC CLOCKS
Filed Oct. 29, 1928 3 Sheets-Sheet 1

ARTHUR F. POOLE INVENTOR.

BY

ATTORNEY.

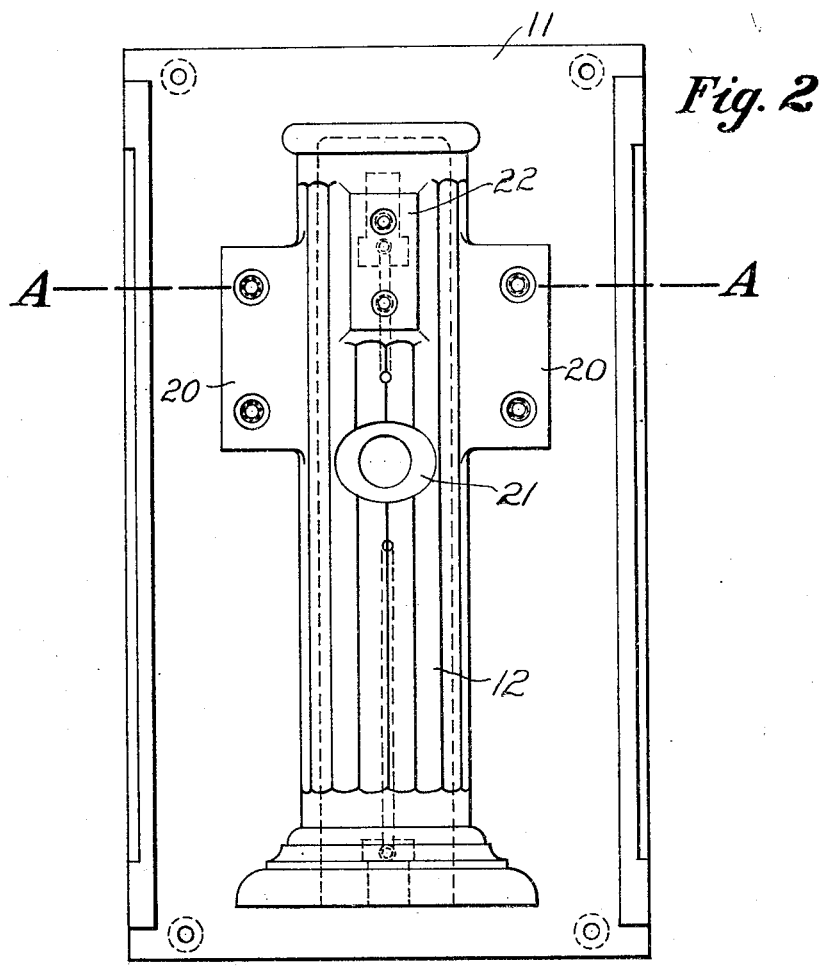
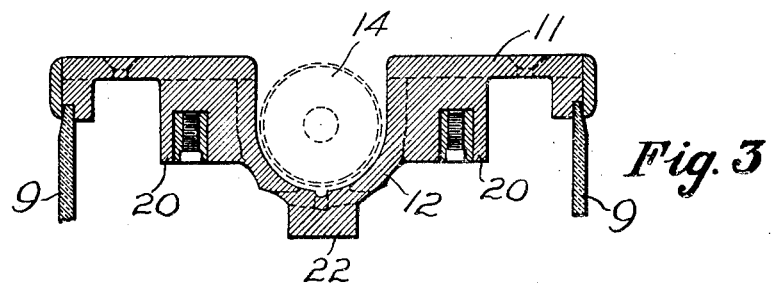

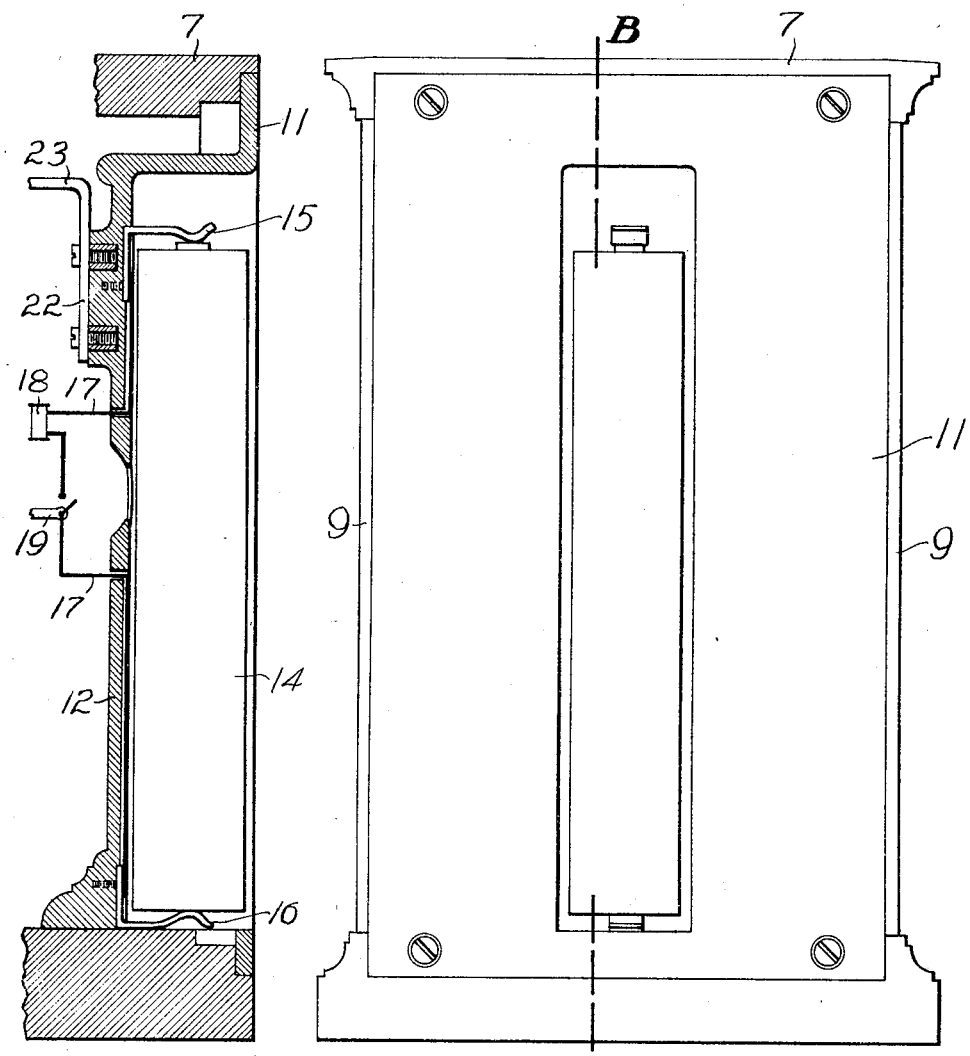

Patented Nov. 10, 1931

1,831,261

UNITED STATES PATENT OFFICE

ARTHUR F. POOLE, OF ITHACA, NEW YORK, ASSIGNOR TO POOLE MANUFACTURING CO., OF ITHACA, NEW YORK, A CORPORATION OF NEW YORK

CASE FOR ELECTRIC CLOCKS

Application filed October 29, 1928. Serial No. 315,747.

This invention relates to electric clocks, and is particularly concerned with the case or supporting structure on which the mechanism is mounted or enclosed. The structure is especially suited to electric clocks of the type driven by dry cells, though it also may be applied to other types. In the forms of such clocks most generally used in the past, the battery was either located under the base, or dropped into the top of a tube which was covered by a cap. These forms made it difficult to change the battery without either moving the clock or removing its case. One object of the present invention is to provide a more convenient and useful form, without impairing the appearance of the case, and one which will permit the change of batteries without moving or removing any other part of the clock. Various other objects will become apparent as the description proceeds.

Referring now to the drawings forming part of this specification,

Fig. 2 is a front view of the back panel of the case.

Fig. 3 is a transverse cross-section taken on the line A—A of Fig. 2.

Fig. 4 is a rear elevation view of the back panel and battery.

Fig. 5 is a vertical cross-section taken on the line B—B of Fig. 4.

Figure 1:
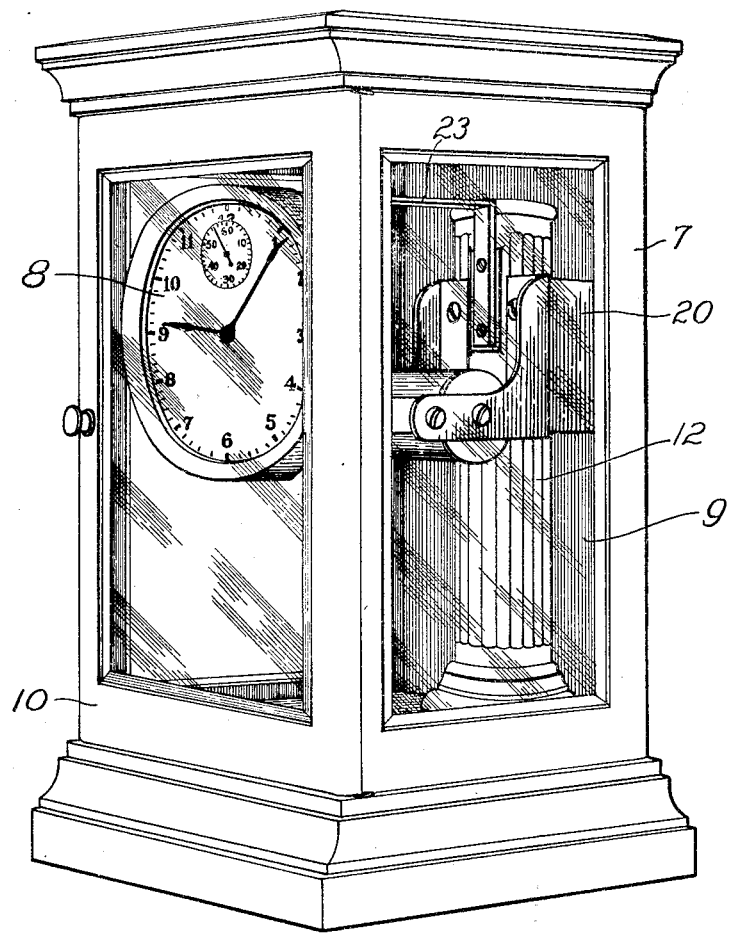
Fig. 1 is a perspective view of a clock case embodying the invention in one illustrative form.

Referring now to Fig. 1, which shows by way of illustration one embodiment, the invention is there shown applied to a rectangular glass walled case 7 containing an electric clock of the dry battery type, designated in general by the reference numeral 8. The frame of the case 7 may be of wood, metal, or any other suitable material, but preferably of some molded material such as bakelite, if the case is being manufactured in considerable quantities. Fixed glass panels 9 and 9 are provided in the sides of the case 7, and a glass paneled door 10 is hinged in front. The rear panel 11 is preferably solid and of the same material as the case, as shown more in detail in Fig. 2, Fig. 3, Fig. 4 and Fig. 5. It is characterized by a column like member 12, which seen from the front appears to be a column supporting the clock mechanism 8; but the column portion is hollow and open at the back as is evident from Fig. 3, Fig. 4 and Fig. 5 and adapted to contain a battery 14, such as an ordinary flashlight battery for example. This battery 14 is preferably mounted or supported between spring clips 15 and 16, so that it can be readily inserted or removed without unscrewing any wires. These clips 15 and 16 are connected by conductors 17 to the operative circuits of the electric clock, such as the electro-magnet 18 and tripping switch 19, (indicated diagrammatically in Fig. 5). The particular structure of the electric clock mechanism is immaterial to the present invention, except as regards the battery mounting and parts adjacent thereto.

The column portion 12 as viewed from the front may be of any attractive design, and may if necessary be provided with bosses and/or depressions to accommodate the adjacent mechanism, such as, for example, the bosses 20 to support the electro-magnet 18, a hollow 21 to allow for the windings of the magnet 18, and a boss 22 to hold the clock face supporting bracket 23. Such arrangements will of course vary with clocks of different makes.

While in the illustrative form shown the column portion 12 is molded as part of the back panel 11, in as much as it is part of a rectangular case, the chief feature of the column 12 is that it is open at the back so as to permit the battery 14 to be readily inserted or removed. The invention is accordingly not limited to rectangular cases, or cases with back panels, but is equally applicable to other forms.

While I have in the foregoing described the invention in one preferred embodiment, it will be understood that this is merely by way of example and that the invention is not limited thereto, but is susceptible to various modifications and adaptations in different installations as will be apparent to those skilled in the art, without departing from the scope of the invention as set forth in the following claims.

I claim:

1. In an electric clock, the combination of a base, a rear panel having a projection on the forward side and a depression in the rear, said depression forming an open chamber in the rear in which a battery may be placed, a clock mechanism attached to the forward side of the panel, and an enclosure for the clock mechanism abutting the panel and completing the case.

2. In an electric clock, a casing having a transparent front wall, electrically actuated clock mechanism completely enclosed in said casing and visible through said front wall, the rear wall of said casing having a recess in its outer face of a size to receive and mount a dry battery unit, contacts on said rear wall in said recess for making electrical contact with the terminals of said unit when the unit is inserted, and conductors within said casing and connecting said contacts with said mechanism.

3. In an electric clock, a casing, electric clock mechanism completely enclosed in said casing, one wall of said casing having an outwardly opening recess of a size to receive and mount therein a dry battery unit, contacts carried by said wall in said recess for making electrical contact with terminals of said unit when the unit is inserted, and conductors in said casing connecting said contacts with said mechanism.

4. In an electric clock, a casing, electric clock mechanism completely enclosed in said casing, one wall of said casing having an outwardly opening recess of a size to receive and mount therein a dry battery unit, spaced contacts one of which is resilient, carried by said wall in said recess for receiving and yieldingly holding said unit, when said unit is inserted into said recess, and making contact with the terminals of said unit while so held, and conductors in said casing connecting said contacts with said mechanism, whereby said unit may be replaced without opening said casing.

In witness whereof I have hereunto set my hand this 26th day of October, 1928.

ARTHUR F. POOLE.